United States Patent Office 3,068,251
Patented Dec. 11, 1962

3,068,251
PROCESS FOR THE PREPARATION OF 16α-HYDROXYLATED STEROIDS AND NOVEL INTERMEDIATES
Barney J. Magerlein, Portage Township, Kalamazoo County, and Robert D. Birkenmeyer and Fred Kagan, Kalamazoo, Mich., assignors to The Upjohn Company, Kalamazoo, Mich., a corporation of Delaware
No Drawing. Filed Jan. 11, 1960, Ser. No. 1,423
17 Claims. (Cl. 260—397.45)

This invention relates to a novel process for the preparation of 16α-hydroxylated steroids and novel $\Delta^{16}$ compounds of the pregnane series used in the preparation thereof.

The novel process of the present invention is represented by the following reaction scheme:

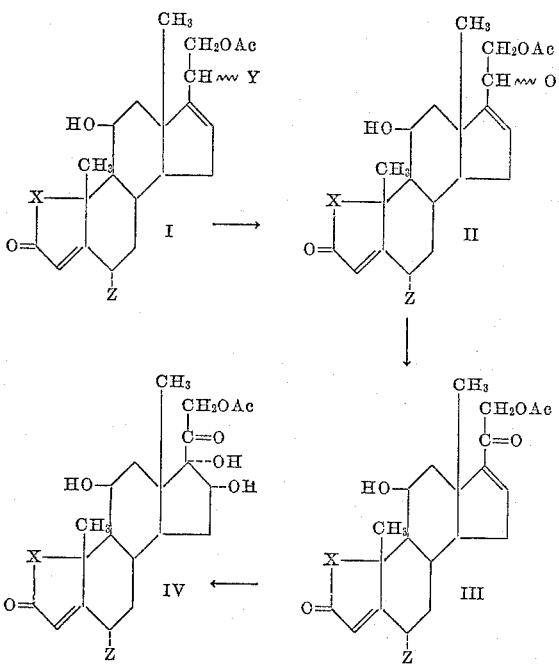

wherein X is selected from the group consisting of

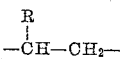

and

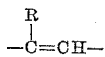

R being attached at the 2-position and selected from the group consisting of hydrogen and methyl, Y represents chlorine or bromine, and Z represents hydrogen, fluorine, or methyl, and Ac is the acyl radical of an organic carboxylic acid, particularly a hydrocarbon carboxylic acid containing from 1 to 12 carbon atoms, inclusive.

In this application the wavy line ( $\}$ ) represents a generic expression including the ($\alpha$) and ($\beta$) configuration.

The starting compounds of the process of this invention, the compounds of Formula I, are prepared according to the procedures disclosed in U.S. application Serial No. 1,449, filed on January 11, 1960, of even date herewith.

The process of the present invention comprises reacting steroids of the type represented by Formula I, such as 20α - chloro-11β,21-dihydroxy-1,4,16-pregnatrien-3-one 21-acetate, with a silver salt, preferably a silver inorganic salt, e.g., silver fluoride, silver nitrate, silver oxide and the like, and water, in the presence of a water-miscible, inert organic solvent, e.g., acetonitrile, tetrahydrofuran, dioxane, acetone, and the like, or mixtures thereof, to obtain the compounds of Formula II, such as 11β,20β,21-trihydroxy-1,4,16-pregnatrien-3-one 21-acetate. The reaction is usually conducted between 0° and 100° C., preferably at reflux temperature. Completion of the reaction can take from about 5 minutes to about 2 hours, depending in part on the temperature employed and the solvent employed.

Alternatively, the starting steroids of Formula I can be reacted with the silver salt under anhydrous conditions, in the presence of an inert organic solvent, such as acetonitrile, tetrahydrofuran, dioxane, acetone, nitromethane, and the like, preferably acetonitrile, followed by reaction with water to yield the compounds of Formula II. The reaction with water can take place on a Florisil (synthetic magnesium silicate having water of hydration) column or water can be added to the reaction product obtained by reacting the starting steroid with the silver salt.

The thus obtained compounds of Formula II are recovered from the reaction mixture by conventional methods, such as, for example, dilution of the reaction mixture with water, extraction with a water-immiscible solvent such as methylene chloride, ethyl acetate, benzene, toluene and the like, followed by chromatography, recrystallization, or a combination of these.

The compounds of Formula II, such as 11β,20β,21-trihydroxy-1,4,16-pregnatrien-3-one 21-acetate are selectively oxidized to obtain the compounds of Formula III, such as 11β,21-dihydroxy-1,4,16-pregnatriene-3,20-dione 21-acetate. The oxidation reaction is carried out in the presence of an inert organic solvent, such as ethyl acetate, chloroform, methylene chloride, a hydrocarbon solvent, e.g., benzene, or the like, preferably ethyl acetate, using manganese dioxide. The reaction is usually conducted at between about 0° and 100° C., room temperature being preferred. Completion of the reaction can take from 1 to 24 hours depending on the temperature and solvent employed. The thus obtained compounds of Formula III are recovered from the reaction mixture by conventional means, such as, for example, concentration of the reaction mixture, precipitation, or extraction, and are purified by conventional means such as chromatography or crystallization or a combination of these.

The compounds of Formula III, such as 11β,21-dihydroxy-1,4,16-pregnatriene-3,20-dione 21-acetate are then subjected to hydroxylation, followed by hydrolysis, to obtain the compounds of Formula IV, such as 11β,16α,17α, 21 - tetrahydroxy-1,4-pregnadiene - 3-20 - dione 21 - acetate. The hydroxylation reaction is carried out in the presence of a tertiary amine and an inert organic solvent using osmium tetroxide. Suitable solvents are hydrocarbon solvents, e.g., benzene, toluene, ethyl acetate, tertiary butyl alcohol, ethers, and the like. Suitable tertiary amines are pyridine, lutidine, triethylamine, and the like. In the preferred embodiment, the osmium tetroxide hydroxylation reaction is carried out in the presence of benzene and pyridine. The reaction is usually conducted at between about 0° and 100° C., preferably at about room temperature. Completion of the reaction can take from about 1 hour to several days, depending in part on the temperature, solvent and tertiary amine employed. After the hydroxylation reaction is completed, the reaction mixture is hydrolyzed in a basic medium, for example, aqueous alcoholic solutions containing sodium sulfite, sodium or potassium bicarbonate, or mixtures thereof. The mildly alkaline solution can conveniently contain a water-miscible organic solvent such as methanol, ethanol, tertiary butyl alcohol, dioxane and the like, and if desired a water-immiscible organic solvent, such as benzene, or combinations of a water-miscible and water-immiscible solvent.

The hydroxylation of the compounds of Formula III to the compounds of Formula IV can also be carried out using osmium tetroxide and hydrogen peroxide, in the presence of an inert organic solvent, or potassium permanganate in aqueous acetone.

The following examples are illustrative of the process and products of this invention. In the examples which follow, the Roman numeral following the name of a compound is used to indicate the relation of the compound to the reaction scheme depicted above.

EXAMPLE 1

*11β,20β,21-Trihydroxy-1,4,16-Pregnatrien-3-One 21-Acetate (II)*

A. 5.0 g. (0.0123 mole) of 20α-chloro-11β,21-dihydroxy-1,4,16-pregnatrien-3-one 21-acetate (I), 5.0 g. (0.039 mole) of dry silver fluoride and 500 ml. of acetonitrile were heated, under a stream of nitrogen, at reflux for 1 hour. The reaction mixture was then cooled, filtered, and the filtrate thus obtained was evaporated to dryness leaving a solid residue weighing 4.7 g. The thus obtained solid residue was dissolved in methylene chloride and poured onto a 400 g. Florisil (synthetic magnesium silicate) chromatographic column packed wet in Skellysolve B hexanes. The chromatographic column was developed by eluting with Skellysolve B hexanes containing increasing amounts of acetone. The eluate fractions were freed of solvent and those fractions eluted with Skellysolve B hexanes containing 15% to 18% acetone were combined to yield 3.8 g. of crystalline material which was recrystallized from an ethyl acetate-Skellysolve B hexanes mixture to give an analytical sample of 11β,20β,21-trihydroxy - 1,4,16 - pregnatrien-3-one 21-acetate (II) having a melting point of 194–196° C., $\lambda_{max.}^{EtOH}$ 243 m$\mu$, $a_M$ 15,600 and the following analysis:

*Analysis.*—Calcd. for $C_{23}H_{30}O_5$: C, 71.48; H, 7.82. Found: C. 71.29; H, 7.73.

B. A solution of 45.8 g. (0.27 mole) of silver nitrate and 50 g. (0.138 mole) of 20α-chloro-11β,21-dihydroxy-1,4,16-pregnatrien-3-one 21-acetate (I) in 3 l. of 90% acetonitrile-water was heated under reflux for 1 hour. The reaction mixture thus obtained was distilled in vacuo leaving a solid residue. The residue obtained was partitioned between methylene chloride and water and the silver salts which had precipitated were removed by filtration. The organic phase was separated, washed with saturated sodium chloride solution and dried over sodium sulfate. The organic phase was then poured onto a 1 kg. Florisil (synthetic magnesium silicate) chromatographic column packed in Skellysolve B hexanes. The chromatographic column was developed by eluting with Skellysolve B hexanes containing increasing amounts of acetone. The eluate fractions were freed of solvent and those semicrystalline fractions which had been eluted with Skellysolve B hexanes containing 15–20% acetone were combined and recrystallized from an ethyl acetate-Skellysolve B hexanes mixture to yield 18.8 g. of 11β,20β,21-trihydroxy-1,4,16-pregnatrien-3-one 21-acetate (II) having a melting point of 189–190° C. Further recrystallization from ethyl acetate-Skellysolve B hexanes raised the melting point to 194–196° C.

Similarly substituting a stoichiometric equivalent amount of 20α-bromo-11β,21-dihydroxy-1,4,16-pregnatrien-3-one 21-acetate for 20α-chloro-11β,21-dihydroxy-1,4,16-pregnatrien-3-one 21-acetate in the procedure of Example 1A or 1B is productive of 11β,20β,21-trihydroxy-1,4,16-pregnatrien-3-one 21-acetate.

In like manner, substituting other 21-acylates of 20α-bromo- and 20α-chloro-11β,21-dihydroxy-1,4,16-pregnatrien-3-one 21-acetate is productive of the corresponding 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 11β,20β,21-trihydroxy-1,4-16-pregnatrien-3-one.

Likewise, substituting a stoichiometric equivalent amount of

20α-bromo- and 20α-chloro-11β,21-dihydroxy-4,16-pregnadien-3-one 21-acetate (or other 21-acylates), 6α-fluoro-20α-bromo- and 6α-fluoro-20α-chloro-11β,21-dihydroxy-4,16-pregnadien-3-one 21-acetate (or other 21-acylates), 6α-fluoro - 20α - bromo- and 6α-fluoro-20α-chloro-1,4,16-pregnatrien-3-one 21-acetate (or other 21-acylates), 6α-methyl-20α-bromo- and 6α-methyl-20α-chloro-11β,21-dihydroxy-4,16-pregnadien-3-one 21-acetate (or other 21-acylates), 6α-methyl-20α-bromo- and 6α-methyl-20α-chloro-1,4,16-pregnatrien-3-one 21-acetate (or other 21-acylates), 2α-methyl-20α-bromo- and 2α-methyl-20α-chloro-11β,21-dihydroxy-4,16-pregnadien-3-one 21-acetate (or other 21-acylates), 2-methyl-20α-bromo- and 2 - methyl-20α-chloro-1,4,16-pregnatrien-3-one 21-acetate (or other 21-acylates), 2α-methyl-6α-fluoro-20α-bromo- and 2α-methyl-6α-fluoro-20α-chloro-11β,21-dihydroxy - 4,16 - pregnadien-3-one 21-acetate (or other 21-acylates), 2-methyl-6α-fluoro-20α-bromo- and 2-methyl-6α-fluoro-20α-chloro-1,4,16-pregnatrien-3-one 21 - acetate (or other acylates), 2α,6α-dimethyl - 20α - bromo- and 2α,6α-dimethyl - 20α - chloro - 11β,21 - dihydroxy - 4,16-pregnadien-3-one 21-acetate (or other 21-acylates), and 2,6α-dimethyl-20α-bromo- and 2,6α-dimethyl-20α-chloro-1,4,16-pregnatrien-3-one 21-acetate (or other 21-acylates), for 20α-chloro-11β,21-dihydroxy-1,4,16-pregnatrien-3-one 21-acetate is productive of 11β,20β,21-trihydroxy-4,16-pregnadien - 3 - one 21-acetate (or other 21-acylates), 6α-fluoro-11β,20β,21-trihydroxy - 4,16 - pregnadien-3-one 21-acetate (or other acylates), 6α - fluoro-11β,20β,21-trihydroxy-1,4,16-pregnatrien-3-one 21-acetate (or other 21-acylates), 6α-methyl-11β,20β,21-trihydroxy - 4,16 - pregnadien-3-one 21-acetate (or other 21-acylates), 6α-methyl-11β,20β,21 - trihydroxy - 1,4,16 - pregnatrien-3-one 21-acetate (or other 21-acylates), 2α-methyl-11β,20β,21-trihydroxy - 4,16-pregnadien-3-one 21-acetate (or other 21-acylates), 2-methyl-11β,20β,21 - trihydroxy-1,4,16-pregnatrien-3-one 21-acetate (or other 21-acylates), 2α-methyl-6α-fluoro - 11β,20β,21 - trihydroxy - 4,16-pregnadien-3-one 21-acetate (or other acylates), 2-methyl-6α-fluoro-11β,20β,21-trihydroxy - 1,4,16-pregnatrien-3-one 21-acetate (or other 21-acylates), 2α,6α-dimethyl-11β,20β,21-trihydroxy - 4,16 - pregnadien-3-one 21-acetate (or other acylates), and 2,6α- dimethyl-11β,20β,21 - trihydroxy-1,4,16-pregnatrien-3-one 21-acetate (or other 21-acylates), respectively.

In the preceding paragraph the term "other 21-acylates" includes, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-

(2-butynoate), the 21-undecolate, the 21-cinnamate, the 21-maleate, the 21-citraconate, and the like.

In like manner, substituting a mixture comprising the 20α- and 20β-epimeric forms of the 20-chloro or 20-bromo compounds described in Examples 2A and 2B, respectively, of copending application Serial No. 1449, filed on January 11, 1960, of even date herewith, for 20α-chloro-11β,21-dihydroxy-1,4,16-pregnatrien-3-one 21-acetate (or 20β-bromo-11β,21-dihydroxy-1,4-pregnatrien-3-one 21-acetate) is productive of a mixture comprising the 20α-hydroxy compounds, otherwise corresponding to the 20β-hydroxy compounds described above, and the 20β-hydroxy compounds. This mixture comprising the 20α-hydroxy and 20β-hydroxy compounds can be used in Example 2 without further treatment. The mixture comprising the 20α-hydroxy compounds can be chromatographed or countercurrently extracted, followed by crystallization to separate the 20α-hydroxy compounds from the 20β-hydroxy compounds and thus obtain them as separate entities.

EXAMPLE 2

11β,21-Dihydroxy-1,4,16-Pregnatriene-3-20-Dione 21-Acetate (III)

1.3 g. (0.00336 mole) of 11β,20β,21-trihydroxy-1,4,16-pregnatrien-3-one 21-acetate (II), 140 ml. of ethyl acetate and 5.0 g. of activated manganese dioxide were shaken at about 25° C. for about 17 hours. The reaction mixture was filtered and following concentration and chilling of the reaction mixture there was obtained 925 mg. of a white solid precipitate melting at 200–208° C. Recrystallization from ethyl acetate gave an analytical sample of 11β,21-dihydroxy-1,4,16-pregnatriene-3,20-dione 21-acetate (III), having a melting point of 208–209° C., $[\alpha]_D + 146°$ (CHCl$_3$), $$\lambda_{max.}^{EtOH} \ 242 \ m\mu, \ a_M \ 23,750$$

and the following analysis:

*Analysis.*—Calcd. for C$_{23}$H$_{38}$O$_5$: C, 71.85; H, 7.34. Found: C, 72.08; H, 7.30.

Similarly, substituting other 21-acylates, for example, those named in the penultimate paragraph of Example 1, of 11β,20β,21-trihydroxy-1,4,16-pregnatrien-3-one for 11β,20β,21-trihydroxy-1,4,16-pregnatrien-3 - one 21-acetate, is productive of the corresponding 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, the 21-citraconate, and the like, of 11β,21-dihydroxy-1,4,16-pregnatriene-3,20-dione.

In like manner, substituting a stoichiometric equivalent amount of
11β,20β,21-trihydroxy-4,16-pregnadien-3-one 21 - acetate (or other 21-acylates),
6α-fluoro-11β,20β,21-trihydroxy-4,16-pregnadien - 3 - one 21-acetate (or other 21-acylates),
6α-fluoro-11β,20β,21-trihydroxy - 1,4,16 - pregnatrien - 3 - one 21-acetate (or other 21-acylates),
6α-methyl-11β,20β,21-trihydroxy,4,16-pregnadien-3 - one 21-acetate (or other 21-acylates),
6α-methyl-11β,20β,21-trihydroxy-1,4,16-pregnatrien - 3 - one 21-acetate (or other 21-acylates),
2α-methyl-11β,20β,21-trihydroxy-4,16-pregnadien-3 - one 21-acetate (or other 21-acylates),
2-methyl-11β,20β,21-trihydroxy-1,4,16-pregnatrien-3 - one 21-acetate (or other 21-acylates),
2α-methyl-6α-fluoro-11β,20β,21-trihydroxy-4,16 - pregnadien-3-one 21-acetate (or other 21-acylates),
2-methyl-6α-fluoro-11β,20β,21-trihydroxy-1,4,16 - pregnatrien-3-one 21-acetate (or other 21-acylates),
2α,6α-dimethyl-11β,20β,21-trihydroxy-4,16 - pregnadien - 3-one 21-acetate (or other 21-acylates), and
2,6α-dimethyl-11β,20β,21-trihydroxy-1,4,16 - pregnatrien-3-one 21-acetate (or other 21-acylates) for 11β,20β,21-trihydroxy-1,4,16-pregnatrien-3-one 21-acetate is productive of
11β,21-dihydroxy-4,16-pregnadiene-3,20-dione 21-acetate (or other 21-acylates),
6α-fluoro-11β,21-dihydroxy-4,16-pregnadiene-3,20 - dione 21-acetate (or other 21-acylates),
6α-fluoro-11β,21-dihydroxy - 1,4,16 - pregnatriene - 3,20-dione 21-acetate (or other 21-acylates),
6α-methyl-11β,21-dihydroxy-4,16-pregnadiene - 3,20 - dione 21-acetate (or other 21-acylates),
6α-methyl-11β,21-dihydroxy-1,4,16-pregnatriene-3,20 - dione 21-acetate (or other 21-acylates),
2α-methyl-11β,21-dihydroxy-4,16-pregnadiene - 3,20 - dione 21-acetate (or other 21-acylates),
2-methyl-11β,21-dihydroxy-1,4,16-pregnatriene-3,20- - dione 21-acetate (or other 21-acylates),
2α-methyl-6α-fluoro-11β,21-dihydroxy-4,16 - pregnadiene-3,20-dione 21-acetate (or other 21-acylates),
2-methyl-6α-fluoro-11β,21 - dihydroxy - 1,4,16 - pregnatriene-3,20-dione 21-acetate (or other 21-acylates),
2α,6α-dimethyl-11β,21-dihydroxy-4,16-pregnadiene - 3,20-dione 21-acetate (or other acylates), and
2,6α-dimethyl-11β,21-dihydroxy-1,4,16 - pregnatriene - 3, 20-dione 21-acetate (or other 21-acylates), respectively.

The term "other 21-acylates" as used in the preceding paragraph includes, for example, those named in the penultimate paragraph of Example 1.

In like manner, substituting the mixture comprising the 20α-hydroxy and 20β-hydroxy compounds described in Example 1 is productive of the 20-keto compounds described in this example.

EXAMPLE 3

11β,16α,17α,21-Tetrahydroxy-1,4-Pregnadiene 3,20-Dione 21-Acetate (IV)

1.19 g. (0.0031 mole) of 11β,21-dihydroxy-1,4,16-pregnatriene-3,20-dione 21-acetate (III), 25 ml. of benzene, 1.2 ml. of pyridine and 785 mg. (0.031 mole) of osmium tetroxide were allowed to stand at about 25° C. for about 100 hours. The thus obtained dark brown reaction mixture was then poured into a solution made up of 55 ml. of water, 20 ml. of benzene, 36 ml. of methanol, 5.6 g. sodium sulfite and 5.6 g. of potassium bicarbonate and stirred for 4 hours. This mixture was extracted with six 100-ml. portions of hot chloroform and the chloroform extracts thus obtained were combined and washed with dilute hydrochloric acid and then with water. The combined washed extracts were filtered and following evaporation of the chloroform, 670 mg. of a tan solid was obtained. Recrystallization from methanol gave 230 mg. of 11β,16α,17α,21 - tetrahydroxy - 1,4 - pregnadiene - 3, 20-dione 21-acetate (IV), as a methanol solvate having an $[\alpha]_D + 67°$ (CHCl$_3$).

$$\lambda_{max.}^{EtOH} \ 243 \ m\mu, \ a_M \ 14,300$$

The thus obtained methanol solvate of 11β,16α,17α,21-tetrahydroxy-1,4-pregnadiene-3,20-dione 21-acetate was dried at 120° C. to give 11β,16α,17α,21-tetrahydroxy-1,4-pregnadiene-3,20-dione 21-acetate (IV) which had the following analysis:

*Analysis.*—Calcd. for C$_{23}$H$_{30}$O$_7$: C, 66.01; H, 7.23. Found: C, 66.15; H, 7.60.

Similarly, substituting other 21-acylates, for example, those named in the last paragraph of Example 1, of 11β, 21-dihydroxy-1,4,16-pregnatriene-3,20-dione for 11β,21-dihydroxy-1,4,16-pregnatriene-3,20-dione 21-acetate is productive of the corresponding 21-acylates, such as, for example, the 21-formate, the 21-propionate, the 21-butyrate, the 21-valerate, the 21-hexanoate, the 21-laurate, the 21-trimethylacetate, the 21-isobutyrate, the 21-isovalerate, the 21-tertiarybutylacetate, the 21-(β-cyclopentylpropionate), the 21-cyclohexanecarboxylate, the 21-cyclohexylacetate, the 21-benzoate, the 21-phenylacetate, the 21-(β-phenylpropionate), the 21-(o-, m-, p-toluate), the 21-hemisuccinate, the 21-hemiadipate, the 21-acrylate, the 21-crotonate, the 21-propiolate, the 21-(2-butynoate), the 21-undecolate, the 21-cinnamate, the 21-maleate, and the 21-citraconate, and the like, of 11β,16α,17α,21-tetrahydroxy-1,4-pregnadiene-3,20-dione.

In like manner substituting a stoichiometric equivalent amount of

11β,21-dihydroxy-4,16-pregnadiene-3,20-dione 21-acetate (or other 21-acylates),
6α-fluoro-11β,21-dihydroxy-4,16-pregnadiene-3,20-dione 21-acetate (or other 21-acylates),
6α-fluoro-11β,21-dihydroxy-1,4,16-pregnatriene-3,20-dione 21-acetate (or other 21-acylates),
6α-methyl-11β,21-dihydroxy-4,16-pregnadiene-3,20-dione 21-acetate (or other 21-acylates),
6α-methyl-11β,21-dihydroxy-1,4,16-pregnatriene-3,20-dione 21-acetate (or other 21-acylates),
2α-methyl-11β,21-dihydroxy-4,16-pregnadiene-3,20-dione 21-acetate (or other 21-acylates),
2-methyl-11β,21-dihydroxy-1,4,16-pregnatriene-3,20-dione 21-acetate (or other 21-acylates),
2α-methyl-6α-fluoro-11β,21-dihydroxy-4,16-pregnadiene-3,20-dione 21-acetate (or other 21-acylates),
2-methyl-6α-fluoro-11β,21-dihydroxy-1,4,16-pregnatriene-3,20-dione 21-acetate (or other acylates),
2α,6α-dimethyl-11β,21-dihydroxy-4,16-pregnadiene-3,20-dione 21-acetate (or other 21-acylates), and
2,6α-dimethyl-11β,21-dihydroxy-1,4,16-pregnatriene-3,20-dione 21-acetate (or other 21-acylates), for 11β,21-dihydroxy-1,4,16-pregnatriene-3,20-dione 21-acetate is productive of 11β,16α,17α,21-tetrahydroxy-4-pregnene-3,20-dione 21-acetate (or other 21-acylates),
6α-fluoro-11β,16α,17α,21-tetrahydroxy-4-pregnene-3,20-dione 21-acetate (or other 21-acylates),
6α-fluoro-11β,16α,17α,21-tetrahydroxy-1,4-pregnadiene-3,20-dione 21-acetate (or other 21-acylates),
6α-methyl-11β,16α,17α,21-tetrahydroxy-4-pregnene-3,20-dione 21-acetate (or other 21-acylates),
6α-methyl-11β,16α,17α,21-tetrahydroxy-1,4-pregnadiene-3,20-dione 21-acetate (or other 21-acylates),
2α-methyl-11β,16α,17α,21-tetrahydroxy-4-pregnene-3,20-dione 21-acetate (or other 21-acylates),
2-methyl-11β,16α,17α,21-tetrahydroxy-1,4-pregnadiene-3,20-dione 21-acetate (or other acylates),
2α-methyl-6α-fluoro-11β,16α,17α,21-tetrahydroxy-4-pregnene 3,20-dione 21-acetate (or other 21-acylates),
2-methyl-6α-fluoro-11β,16α,17α,21-tetrahydroxy-1,4-pregnadiene-3,20-dione 21-acetate (or other 21-acylates),
2α,6α-dimethyl-11β,16α,17α,21-tetrahydroxy-4-pregnene-3,20-dione 21-acetate (or other 21-acylates), and
2,6α-dimethyl-11β,16α,17α21-tetrahydroxy-1,4-pregnadiene-3,20-dione 21-acetate (or other 21-acylates), respectively.

The term "other 21-acylates" as used in the preceding paragraph includes, for example, those 21-acylates named in the penultimate paragraph of Example 1.

We claim:
1. A compound of the formula:

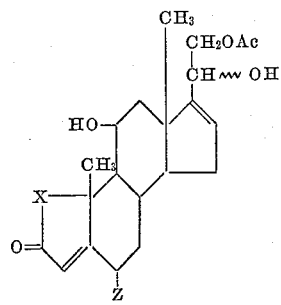

wherein X is selected from the group consisting of

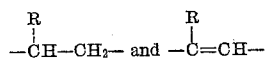

R being attached at the 2-position and selected from the group consisting of hydrogen and methyl, Z is selected from the group consisting of hydrogen, fluorine and methyl, and Ac is the acyl radical of a hydrocarbon carboxylic acid containing from 1 to 12 carbon atoms, inclusive.

2. A mixture comprising 11β,20β,21-trihydroxy-1,4,16-pregnatrien-3-one 21-acetate and 11β,20α,21-trihydroxy-1,4,16-pregnatrien-3-one 21-acetate.

3. 11β,20,21-trihydroxy-1,4,16-pregnatrien-3-one 21-acylate in which the acyl radical is that of a hydrocarbon carboxylic acid containing from 1 to 12 carbon atoms, inclusive.

4. 11β,20β,21-trihydroxy-1,4,16-pregnatrien-3-one 21-acetate.

5. 11β,20α,21-trihydroxy-1,4,16-pregnatrien-3-one 21-acetate.

6. A process which comprises: reacting the compounds of Formula I,

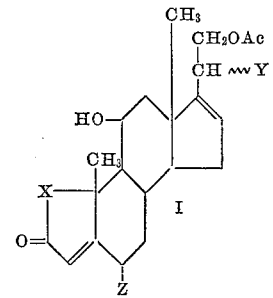

wherein X is selected from the group consisting of

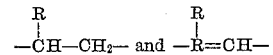

R being attached at the 2-position and selected from the group consisting of hydrogen and methyl, Y is selected from the group consisting of chlorine and bromine, Z is selected from the group consisting of hydrogen, fluorine and methyl, and Ac is an acyl radical, with a silver salt and water in the presence of an inert organic solvent, to obtain the compounds of Formula II,

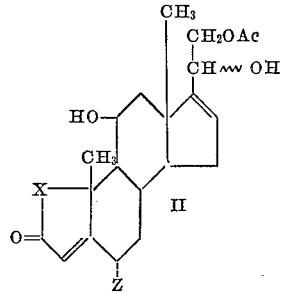

7. The process of claim 6 in which the silver salt is silver nitrate, and the inert organic solvent is acetonitrile.

8. The process of claim 7 in which the starting material is 20α-chloro-11β,21-dihydroxy-1,4,16-pregnatrien-3-one 21-acetate.

9. A process which comprises reacting the compounds of Formula I,

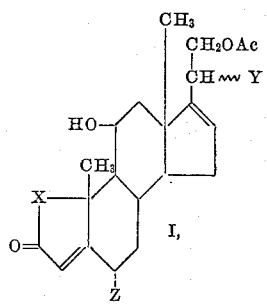

wherein X is selected from the group consisting of

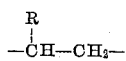

and

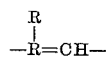

R being attached at the 2-position and selected from the group consisting of hydrogen and methyl, Y is selected from the group consisting of chlorine and bromine, Z is selected from the group consisting of hydrogen, fluorine and methyl, and Ac is an acyl radical, with a silver salt in the presence of an inert organic solvent under anhydrous conditions and reacting the thus-obtained product with water to obtain the compounds of Formula II, and reacting the compounds of Formula III with osmium tetroxide, followed by alkaline hydrolysis, to obtain the compounds of Formula IV,

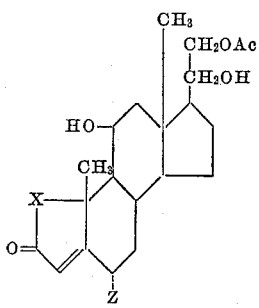

10. The process of claim 9 in which the silver salt is silver fluoride, the inert organic solvent is acetonitrile, and the reaction with water takes place on a Florisil (synthetic magnesium silicate) column.

11. The process of claim 10 in which the starting material is 20α-chloro-11β,21-dihydroxy-1,4,16-pregnatrien-3-one 21-acetate.

12. 6α - methyl - 11β,20,21 - trihydroxy - 1,4,16 - pregnatrien-3-one 21-acylate in which the acyl radical is that of a hydrocarbon carboxylic acid containing from 1 to 12 carbon atoms, inclusive.

13. 6α - methyl - 11β,20β,21 - trihydroxy - 1,4,16-pregnatrien-3-one 21-acetate.

14. 6α - methyl - 11β,20α,21 - trihydroxy - 1,4,16-pregnatrien-3-one 21-acetate.

15. 6α - fluoro - 11β,20,21 - trihydroxy - 1,4,16-pregnatrien-3-one 21-acylate in which the acyl radical is that of a hydrocarbon carboxylic acid containing from 1 to 12 carbon atoms, inclusive.

16. 6α - fluoro - 11β,20β,21 - trihydroxy - 1,4,16-pregnatrien-3-one 21-acetate.

17. 6α - fluoro - 11β,20α,21 - trihydroxy - 1,4,16-pregnatrien-3-one 21-acetate.

References Cited in the file of this patent

UNITED STATES PATENTS 2,900,382    Sondheimer et al. _____ Aug. 18, 1959

OTHER REFERENCES

Bernstein et al.: Journal of Organic Chemistry (1959), vol. 24, pages 871–872 relied on.

UNITED STATES PATENT OFFICE
CERTIFICATE OF CORRECTION

Patent No. 3,068,251                     December 11, 1962

Barney J. Magerlein et al.

It is hereby certified that error appears in the above numbered patent requiring correction and that the said Letters Patent should read as corrected below.

Column 9, lines 42 to 45, strike out "and reacting the compounds of Formula III with osmium tetroxide, followed by alkaline hydrolysis, to obtain the compounds of Formula IV,"; column 10, lines 1 to 12, the formula should appear as shown below instead of as in the patent:

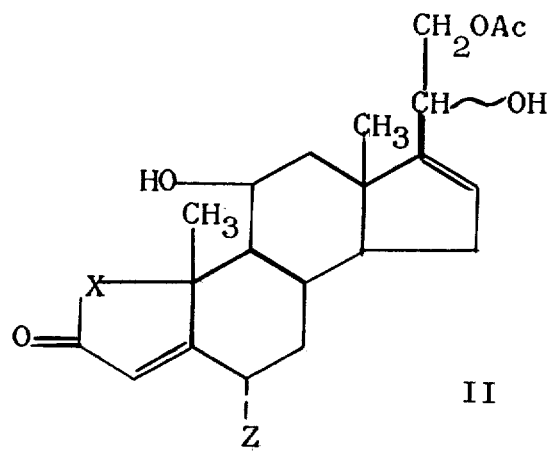

Signed and sealed this 16th day of July 1963.

(SEAL)
Attest:

ERNEST W. SWIDER                          DAVID L. LADD

Attesting Officer                             Commissioner of Patents